UNITED STATES PATENT OFFICE.

CARL LANGE, OF FRIEDLAND, GERMANY.

ARTIFICIAL SAUSAGE-SKIN.

1,157,556.     Specification of Letters Patent.     Patented Oct. 19, 1915.

No Drawing.     Application filed July 24, 1913. Serial No. 780,891.

*To all whom it may concern:*

Be it known that I, CARL LANGE, master butcher, a subject of the German Emperor, and residing at Friedland, district of Breslau, Province of Silesia, Prussia, Germany, have invented certain new and useful Improvements in Artificial Sausage-Skins, of which the following is a description.

The present invention relates to an artificial skin for sausages, which is intended to serve as a substitute for the intestines otherwise used in making sausages and similar preserves.

It has already been proposed to make sausage skins of silk or other woven fabrics; it has also been attempted to use paper, parchment and the like for this purpose. Then again, it has been suggested to use woven fabrics such as gauze for this purpose, which, in order to render them serviceable for making sausages, had to be impregnated with a glue or paste-like substance. A sausage skin of this kind will always maintain its original size, and as the stuffing will shrink in boiling, and with sausages which are stored, the stuffing will dry up, air spaces would be formed in and around the stuffing, which would very soon cause the stuffing to spoil. Besides a skin made in this manner is absolutely indigestible, and even small pieces of it may, if swallowed, cause very serious attacks of indigestion. All such substances, therefore, do not meet the requirements, to be put to a sausage skin. These difficulties are completely obviated according to the present invention by the skin of the sausage being made of the fibers of animal sinews or the like. The sinews are disintegrated into fine fibers, spun and either woven or knitted into the form of round tubes. The fine fibers may, however, also be worked to a paper-like material, of which then the sausage skin is prepared. The sausage skin made after this method can be used without any impregnation, the same as the ordinary intestine. As the skin will also shrink in boiling, it will adhere closely to the stuffing, and as animal sinews are digestible, and no impregnation is necessary, it will do no harm if pieces of such a skin are swallowed. As this skin is made from the tailings of abattoirs and the like, it is, on the one hand, extremely cheap, on the other hand, the sinews being much more cleanly than intestines, even if cleaned ever so well, it will insure a much more cleanly manufacture of the sausages.

I claim:

1. An artificial sausage skin comprising a tube made up of a thin flexible material consisting of the woven parts of animals suitable therefor.

2. An artificial sausage skin comprising a tube made up of a woven, thin flexible material consisting of the sinuous parts of animals.

3. A sausage skin consisting of a tube formed of woven parts of animal bodies suitable therefor.

4. A sausage skin consisting of a tube artificially formed of the sinuous portions of animal bodies.

5. An artificial skin consisting of a tube formed of a woven material subject to shrinkage and expansion the same as the sausage material it is designed to hold.

CARL LANGE.

Witnesses:
    HERMANN WALKER,
    CARL WEISSRATH.

Copies of this patent may be obtained for five cents each, by addressing the "Commissioner of Patents, Washington, D. C."